United States Patent [19]

van der Lely

[11] Patent Number: 4,549,610

[45] Date of Patent: Oct. 29, 1985

[54] VEHICLE WITH FRONT AND REAR STEERABLE WHEELS INDIVIDUALLY DRIVEN BY HYDRAULIC MOTORS

[76] Inventor: Cornelis van der Lely, 7 Brüschenrain, Zug, Switzerland

[21] Appl. No.: 155,225

[22] Filed: Jun. 2, 1980

[30] Foreign Application Priority Data

Jun. 5, 1979 [NL] Netherlands .................. 7904380
Jun. 5, 1979 [NL] Netherlands .................. 7904381

[51] Int. Cl.⁴ .................. A01B 67/00; A01B 63/112
[52] U.S. Cl. .................. 172/3; 172/9; 172/12; 180/6.48; 280/446 R
[58] Field of Search .............. 180/6.48; 172/3, 7, 172/9, 12

[56] References Cited

U.S. PATENT DOCUMENTS

| | | | |
|---|---|---|---|
| 3,154,164 | 10/1964 | Shaw et al. | 180/242 X |
| 3,198,030 | 8/1965 | Miller et al. | 280/775 X |
| 3,221,821 | 12/1965 | van der Lely et al. | 172/7 |
| 3,279,277 | 10/1966 | Stevens et al. | 280/775 X |
| 3,314,690 | 4/1967 | Bunchak | 180/140 X |
| 3,362,247 | 1/1968 | Watts | 180/334 X |
| 3,395,930 | 8/1968 | Morgan | 280/775 |
| 3,446,307 | 5/1969 | Logus | 180/140 |
| 3,641,765 | 2/1972 | Hancock et al. | 180/307 X |
| 3,695,627 | 10/1972 | Bichel et al. | 280/775 |
| 3,865,208 | 2/1975 | Crawshay et al. | 180/6.48 |
| 3,898,811 | 8/1975 | Seaberg | 180/6.48 |
| 4,011,920 | 3/1977 | Bianchetta et al. | 180/6.48 |
| 4,023,622 | 5/1977 | Gregerson | 172/3 |
| 4,105,085 | 8/1978 | van der Lely | 180/43 R |
| 4,105,086 | 8/1978 | Ishii et al. | 180/143 X |
| 4,186,811 | 2/1980 | Bidon | 180/6.48 |
| 4,271,918 | 6/1981 | Molby | 180/6.48 |
| 4,277,898 | 7/1981 | Flippin | 172/3 |
| 4,311,203 | 1/1982 | van der Lely | 180/24 |
| 4,325,442 | 4/1982 | Groenig | 180/6.48 |
| 4,337,587 | 7/1982 | Presley | 37/DIG. 1 |
| 4,343,513 | 8/1982 | Godbersen | 172/3 |
| 4,344,499 | 8/1982 | van der Lely et al. | 180/197 |

Primary Examiner—Joseph Paul Brust
Attorney, Agent, or Firm—Penrose Lucas Albright Pravel, Gambrell, Hewitt & Kimball

[57] ABSTRACT

An agricultural tractor having six wheels which are each hydraulically drivable by individual hydraulic motors through hydraulic fluid supplied by respective hydraulic pumps. With each pump driving only one wheel, skidding of a wheel does not affect drive to other wheels. The pumps are all driven by a single engine. Selectively operable automatic control means control the speed of the wheels when, for example, the tractor is turning. Control means are also responsive to the drag resistance of an implement hitched to the tractor's lifting members and cause such lifting members to raise when the implement's resistance exceeds a predetermined limit. In addition, speed of the vehicle is automatically reduced by reason of such resistance and, further, the position of the implement relative to the ground may be adjusted to offset at the location of the implement upward and downward movement of tandem wheel pairs at the rear of the tractor. Such adjustment is effected by the lifting device and is delayed for a short period to allow movement of the vehicle.

27 Claims, 3 Drawing Figures

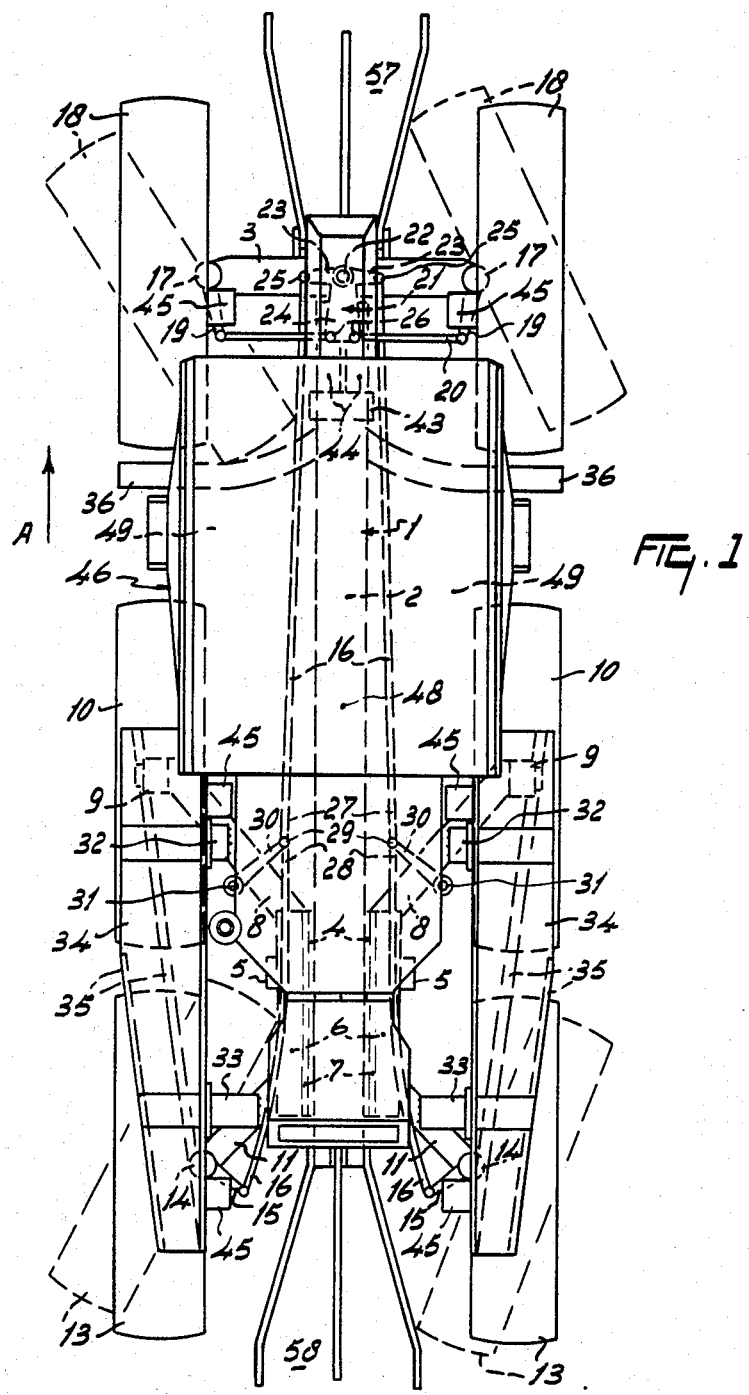

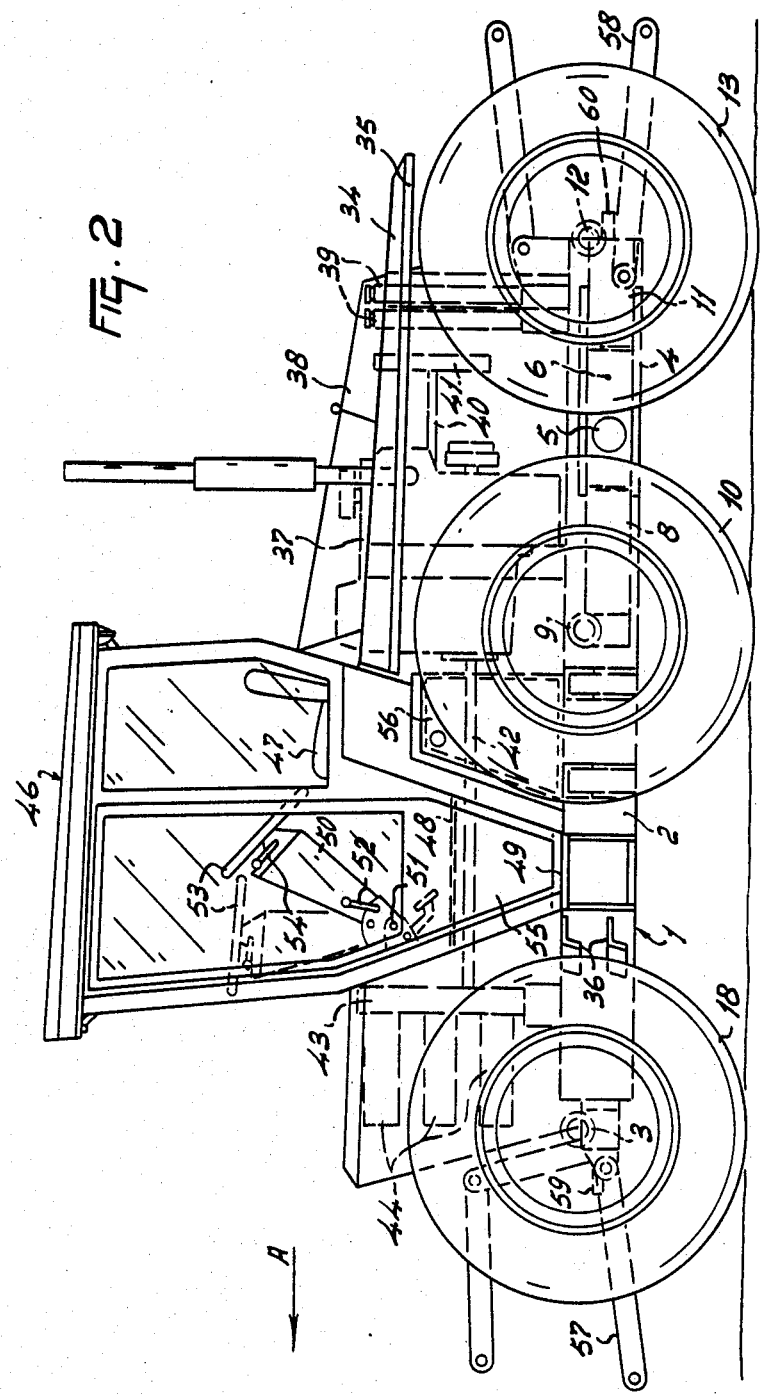

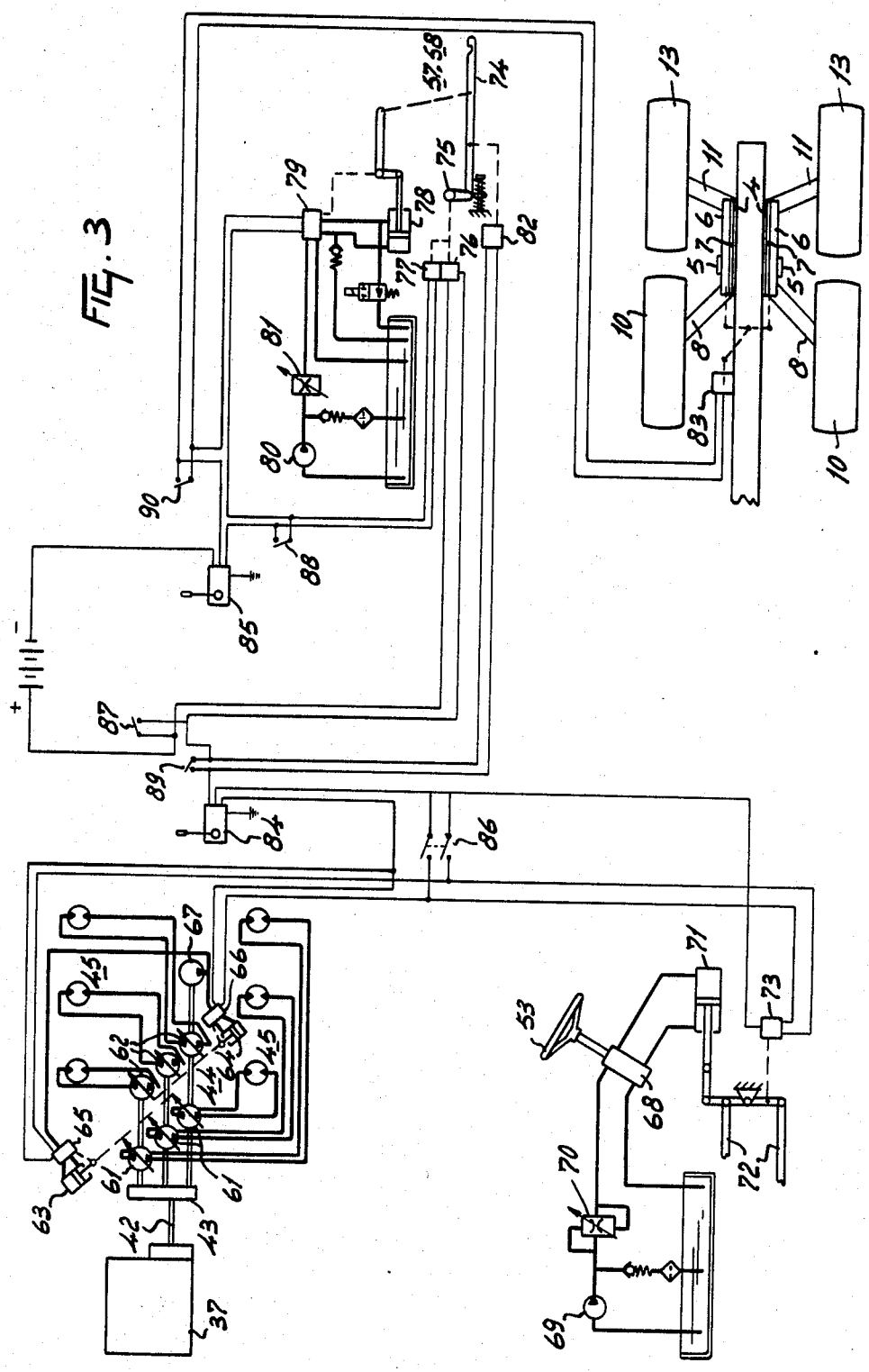

VEHICLE WITH FRONT AND REAR STEERABLE WHEELS INDIVIDUALLY DRIVEN BY HYDRAULIC MOTORS

SUMMARY OF THE INVENTION

This invention relates to a motor vehicle, particularly, although not exclusively, a tractor.

According to the invention, there is provided a motor vehicle, preferably an agricultural tractor, having three-point lifting mechanisms both forward and to the rear, comprising an engine and six wheels, each wheel being hydraulically drivable by a hydraulic motor independently of the other wheels through fluid supplied by a respective hydraulic pump, the pumps being drivable by the engine. The forward and rear wheels are linked together to be steered by a single set of controls in a cabin having a seat above the central wheels' axis of rotation. In the cabin the steering controls are movable and two floor levels are provided so the vehicle can be operated standing or sitting. Automatic controls assist in the steering and raise the lifting mechanisms or reduce the vehicle's speed, or both, in response to resistance generated by an implement attached to the lifting mechanism.

BRIEF DESCRIPTION OF THE DRAWINGS

For a better understanding of the present invention and to show how it may be carried into effect, reference will now be made, by way of example, to the accompanying drawings, in which:

FIG. 1 is a plan view of a tractor;

FIG. 2 is a side elevation of the tractor shown in FIG. 1; and

FIG. 3 shows a diagram of an automatic control circuit of the tractor shown in FIGS. 1 and 2.

DESCRIPTION OF THE PREFERRED EMBODIMENT

FIGS. 1 and 2 show a tractor suitable for agricultural use. The tractor comprises a frame 1 including a hollow frame beam 2, which is generally horizontal and extends for most of the length of the tractor. The beam 2 is relatively slender, its width being about 10 to 15% of the overall width of the tractor. The centerline of the frame beam 2 lies in the vertical, longitudinal central plane of the tractor. Near its front end, the frame beam 2 carries a front axle 3 which extends transversely of the direction of travel A of the tractor. The axle 3 is pivotable with respect to the frame beam 2 about a horizontal pivotal axis extending in the direction A. To each of two vertical sidewalls of the frame beam 2, near the rear end, is rigidly fastened a supporting plate 4, which covers the entire vertical dimension of the frame beam 2 (FIGS. 1 and 3). Two journals 5 are mounted on the frame beam 2, one on each side. The centerlines of the two journals 5 are aligned and extend horizontally and transversely of the direction A. The journals 5 are located at a position along the tractor which is between the ends of the supporting plates 4. The journals 5 project laterally from the supporting plates 4 and each supports a hollow carrier beam 6, which is freely pivotable on its journal 5. Each journal 5 is arranged between the two ends of the associated beam 6 and is completely covered at its end facing the beam 2 by a sliding plate 7, which is rigidly secured to the beam 6. The arrangement is such that the two plates 4 and 7 on each side of the frame beam 2 can slide relatively to one another. If desired, a lubricant of low viscosity can be provided between the plates 4 and 7 on each side of the frame beam 2. When one of the beams 6 turns on its journal 5, the plate 7 fastened to the beam 6 slides over the surface of the plate 4 rigidly secured to the frame beam 2 to provide effective lateral support for the journal 5.

The front end of each beam 6 is provided with a forwardly and outwardly inclined arm 8, which is substantially horizontal, this arm having at its outer end a bearing 9, with a substantially horizontal centerline which is perpendicular to the vertical, longitudinal central plane of the tractor. The bearing 9 supports a ground wheel 10 of the tractor. Another arm 11 is rigidly fastened to the rear end 4 of beam 6, this arm 11 being inclined rearwardly and outwardly away from the beam 6. A bearing 12 is mounted at the outboard end of the arm 11, the centerline of which lies in the same plane as that of the bearing 9. The bearing 12 supports a ground wheel 13. The wheels 10 and 13 are both mounted on the carrier beam 6, which is freely pivotable on the journal 5, so that they together constitute a tandem pair. An identical, but mirror-image, tandem pair is provided on the other side of the frame beam 2.

The centerlines of the bearings 9 are fixed with respect to the arms 8, but the bearings 12 of the wheels 13 are steerable about upwardly extending king pins 14 fastened to the arms 11. A track arm 15 is connected to the rotary axle of each wheel 13. The inboard end of each track arm 15 remote from the pivotal shaft 14 is pivotally connected to a steering rod 16, which extends forwardly away from the track arm 15. Each of the two steering rods 16 extends in this embodiment over almost the whole length of the frame 1 of the tractor and terminates by the front axle 3. Each steering rod 16 is approximately parallel to the vertical, longitudinal central plane of the tractor, or is inclined at a small angle to it. The rear end portion of each steering rod 16 is curved outwardly towards the track arm 15 (FIG. 1), in order to leave room for the wheel 13 to move into a full lock position.

The front axle 3 is provided at each end with an upwardly extending king pin 17, about which are pivotable a stub axle of a front wheel 18 and also a track arm 19 rigidly secured to the stub axle. The ends of the track arms 19 away from the king pins 17 are each connected with one end of a steering rod 20, which is substantially perpendicular to the vertical, longitudinal central plane of the tractor.

The front ends of the two steering rods 16 and the inboard ends of the two steering rods 20 are each connected to a central steering plate 21 for pivotal movement about upright axes. The plate 21 is itself pivotable about an upright pivotal shaft 22 (FIG. 1) located in the longitudinal central plane of the tractor. Viewed on plan, in the straight-ahead position of the steerable wheels 13 and 18, the steering plate 21 is disposed symmetrically about the longitudinal central plane of the tractor and has two laterally extending arms 23 and an arm 24 extending rearwardly away from the pivotal shaft 22. The front ends of the two steering rods 16 are pivotably connected to the arms 23 by a ball-and-socket joint 25, and each of the steering rods 20 is pivotally connected to the arm 24 by an upright pivotal shaft 26.

Each steering rod 16 comprises two interconnected portions 27 and 28, which are intercoupled at the level of the middle wheels 10 by a ball-and-socket joint 29, to which is also fastened an arm 30, which is inclined outwardly and rearwardly from the ball-and-socket joint 29 when the steerable wheels are in their straight-ahead positions. The outboard end of each arm 30 is pivotable about a vertical pivotal shaft 31, which is fixed relatively to the arm 8 of the respective tandem pair. The portion 27 of the steering rod 16 is approximately at the same vertical level as journal 5, whereas the portion 28 is at higher level to the rear away from the ball-and-socket joint 29 to pass above the beam 6.

The two arms 8 and the two arms 11 of the tandem pairs are each provided with upwardly extending supports 32 and 33 which carry mudguards 34. Each of the two mudguards 34 is located vertically above the rear wheels 10 and 13 and is provided with elongate scraper blades 35 (FIG. 1) which project from the lower surface of the mudguard. Each blade 35 is perpendicular to the substantially horizontal mudguard 34. The rear end of each blade 35 is further inboard of the tractor than is the front end, each blade thus being inclined inwardly from front to rear.

The mudguards 34 and at least one of the blades 35 extend approximately from a location to the rear of the rotary axis of the rear wheel 13 to a location in front of the rotary axis of the middle wheel 10. The lower edges of the blades 35 are a short distance above a plane going through the uppermost points of the wheels 10 and 13 and are parallel to a plane containing the axes of the wheels 10 and 13. The mudguards 34 and the associated blades 35 move as a unit with the respective tandem pair 6, 8, 10, 11 and 13.

Just behind each front wheel 18, two further scrapers 36 are provided which are disposed one above the other. Each scraper 36 is an angle section (FIG. 2), one limb of which slopes downwardly to the front while the other limb extends horizontally to the rear. The lowermost edge of the downwardly extending limb of the lower scraper 36 is further from the wheel periphery than the lowermost point of the upper scraper. Viewed on plan, at least the inboard portions of the two scrapers 36 located on each side of the longitudinal central plane of the tractor are arcuate, the center of the arc substantially coinciding with the axis of the respective king pin 17.

A driving engine 37, preferably a Diesel engine having a power of about 150 HP, is secured to the frame beam 2. The engine 37 is located at generally the same position along the length of the tractor as the rear part of the middle wheel 10. The engine 37 is surrounded by a cover 38, the rear side of which is located between the rear wheels 13. Near the rear of the engine compartment, there are two radiators 39 disposed one behind the other to provide sufficient cooling for the engine 37. The width of each radiator, measured transversely of the direction A, is comparatively small, being about half the distance between the rear wheels 13 so as to permit the steering movement of these wheels. An auxiliary shaft 40 extends from the engine 37 to the rear and drives a fan 41 disposed ahead of the radiators 39, as is shown schematically in FIG. 2.

The main output shaft of the engine 37 is located at the front of the engine in the longitudinal central plane of the tractor. This output shaft drives a drive shaft 42, which is disposed above and parallel to the frame beam 2 and extends forwardly away from the engine 37. The drive shaft 42 extends from a position near the rotary axes of the wheels 10 to a position level with the rear halves of the front wheels 18. The drive shaft 42 constitutes an input shaft of a gear wheel housing 43, which extends substantially vertically, being perpendicular to the top surface of the frame beam 2. The gear wheel housing 43 has six output shafts each driving a hydraulic pump 44. The hydraulic pumps 44 are arranged in three groups of two pumps, the groups being disposed vertically one above the other. The two pumps of each group disposed at the same level side by side, are on each side of the longitudinal central plane of the tractor. The pumps are located at, or a short distance behind, the rotary axes of the front wheels 18. Each pump 44 drives a single hydraulic motor 45, which is connected to the hub of a respective one of the six wheels 13, 10, 18 through reduction gearing.

The tractor is provided with a driver's cab 46, which is located approximately between the rotary axes of the front wheels 18 and the rotary axes of the middle wheels 10. From FIG. 2 it can be seen that the lower part of the cab 46 converges downwardly so that these walls are located within the space between the peripheries of the wheels 10 and 18 (see the position of the deflected front wheels in FIG. 1). FIG. 2 shows that the cab 46 contains a driver's seat 47 disposed approximately level with the top of the engine 37, above the drive shaft 42. The central vertical plane of the driver's seat 47 coincides with that of the tractor. The cab 46 has floors at different levels. A first floor 48 is located a short distance above the drive shaft 42 and (see FIG. 2) hence the distance between the floor portion 48 and the top of the frame beam 2 is substantially 50 to 80% of the radius of the wheels 10, 13, 18, which have equal diameters. Viewed on plan, the floor 48 is symmetrical about the vertical longitudinal control plane of the tractor and has, measured transversely of that plane, a width substantially equal to the width of the frame beam 2. The sides of the floor 48 meet vertical panels, which, together with the floor 48 surround the driving shaft 42. The lower edges of the panels join to floor portions 49 which are level with the top surface of the frame beam 2, and are disposed symmetrically one on each side of the floor portion 48. The outer edges of the two floor portions 49 meet the two side walls of the cab 46. The distance between the side walls is approximately equal to the width of the gap between the wheels 10, 13, 18, so that each floor portion 49 has a width substantially corresponding to the width of the gap between the frame beam 2 and the wheels. The dimensions are chosen so that a driver sitting on the seat 47 can rest his feet on the floor portion 48, or he can stand up on one of the two floor portions 49.

In front of the driver's seat 47 there is a control console 50, which is pivotable about a pivotal shaft 51 provided at the lower region of the console and extending transversely of the tractor. This pivotal shaft 51 may, as an alternative, extend obliquely to the longitudinal axis of the tractor, so that the top of the console 50, when deflected, moves laterally. The steering console 50 can be secured in various positions by a locking pin 52. FIG. 2 shows in solid lines a position suitable for the driver sitting on the seat 47, and in broken lines a position suitable for a driver standing on one of the two floor portions 49. At the top, the console 50 has a steering wheel 53. The console 50 is also provided with a plurality of other control members, such as a control member 54. These other control members may comprise, for example, steering levers or knobs and pivot as a unit with the console 50. The console 50 together with the steering wheel 53 and the other control members constitutes a steering control assembly.

The internal height of the cab 46 is such that the driver is not hindered by the cab roof whether he is sitting or standing. On one or both sides, the cab 46 has a door 55 extending approximately from the roof of the cab to the top of the frame beam 2.

The hindmost boundary line of the lower part of the cabin has a cavity, the top of which provides a platform on which the seat 47 is mounted. Beneath this platform, and hence beneath the seat 47 and ahead of the engine 37, is mounted a fuel tank 56, accommodated above the drive shaft 42. The cab 46 thus extends above the fuel tank 56, which prevents damage of the tank in the event of accidents, since the tank 56 is protected on the one hand by the wheels and on the other hand by the bulk of mechanical components such as the engine 37 and the torque converter (hydraulic pumps).

At the front and rear, the tractor is provided with three-point lifting devices 57 and 58 respectively both of which can be actuated from the cab: at least the rear lifting device 58 forms part of automatic control-means to be described more fully later in this description.

Near the lifting devices 57 and 58 there are front and rear power take-off shafts 59 and 60, which can be driven by separate hydraulic motors driven by a common auxiliary hydraulic pump, the hydraulic motors being controllable from the driver seat.

During operation the six hydraulic pumps 44, each coupled to a respective one of the wheel motors 45 of the wheels 10, 13, 18, are driven at a substantially contant speed via the drive shaft 42 by the engine 37. The hydraulic pumps 44 are all controllable in a manner to be described more fully later in this description. Each pump 44 is connected by hydraulic conduits with the respective hydraulic motor 45. In this embodiment the motors are connected mechanically to the wheels and are not controllable except through the hydraulic pumps.

As an alternative there may be only four hydraulic pumps 44 each of which drives a respective one of the steerable wheels 13 or 18, so that the middle wheels 10 are not driven. However, in this description, it is assumed that all six of the tractor wheels are driven.

The drive of the wheel motor of each wheel by a separate hydraulic pump has the important advantage that the power supplied to a wheel is not affected by what is happening to the other wheels. For example, where several wheel motors of several wheels are fed from a single pump, skidding of one or more of these wheels results in the non-skidding wheel or wheels receiving a relatively lower power because the skidding wheel or wheels would absorb a proportionally greater part of the pump power.

The hydraulic pumps are disposed in groups near the front of the tractor. The pumps are readily accessible for maintenance, while they do not obstruct the forward view of the driver. Moreover an advantageous weight distribution of the tractor is obtained, since on the one hand the driving engine, which in this case does not have a change-speed mechanism fastened directly to it, is disposed between the axes of the rear wheels 10 and 13 and on the other hand the weight of the hydraulic pumps (constituting change-speed means) acts approximately between the front wheels, ensuring sufficient ground pressure on the front wheels. This is also assisted by the presence of the tandem pairs of rear wheels.

The design of the cab, as stated above, provides two ways of driving the tractor i.e. the driver may sit down, resting his feet on the floor portion 48, the control console being in the position indicated in FIG. 2 by solid lines. The tractor can thus be driven in a normal manner on a field or on a road. Alternatively, the driver may stand on one of the floor portions 49, the console being turned, if desired, towards the front so that during travel the driver can survey the machines hitched to the two lifting devices 57 and 58 through the glass panes in the front and rear walls of the cab, the view in these directions being unobstructed, at the same time the driver has a great freedom of movement. In the latter position the steering wheel and the other control members can be actuated in a normal manner.

In order to negotiate a bend, the driver can cause the wheels 13 and 18 to steer by turning the steering wheel 53 as a result of which the pivotal shaft 22 (FIG. 1) and hence the steering plate 21 will be turned by hydraulic means in a manner to be described hereinafter. Turning of the steering plate 21 causes the front wheels 18 to be turned by the steering rods 20, a tight lock being allowed by the relative narrowness of the frame beam 2. The gap between the frame beam 2 and each of the king pins 17 is at least as wide as the frame beam 2 itself. The arms 23 and the ball-and-socket joints 25 convert turning of the steering plate 21 into forward and rearward displacement respectively of the steering rods 16 extending lengthwise of the tractor, the steering rods thus causing the track arms 15 and the rear wheels 13 to turn. The steering rods 16 are located at a short distance from the sides of the frame beam 2 so that a large steering movement of these wheels is allowed. The steering rods 16 are supported by the arms 30 fastened to the tandem pair. The arms 30 are disposed so that turning of the wheel 13 in the direction to move the front half inwardly causes the portions 27 and 28 to be displaced towards the frame beam 2 so that the steering rods move out of the way of the wheel. For this purpose the arms 30 are extended forwardly and inwardly away from the associated pivotal shaft 31. Since the steering rod portion 27 is located approximately at the same level as the journal 5, the position of the rear wheels 13 is affected only to a negligible extent when the beams 6 deflect.

The two beams 6 are independently pivotable about the journals 5 so that the wheels 10 and 13 on either side of the tractor frame can follow the ground independently of one another. Since the front axle 3 is freely pivotable with respect to the frame about a longitudinal pivot axis, and the rear wheels 10 and 13 on each side of the tractor, can turn up and down while maintaining the wheel pressure, and since the weight of the tractor is advantageously distributed, the overall power can be passed to the ground in a uniform manner though all of the wheels. This uniform power transfer is, moreover, independent of skidding or nonskidding of a wheel under adverse ground conditions because each wheel is driven by its individual pump 44.

During a travel in the direction A the top part of each wheel moves forwardly with respect to the frame. Earth sticking to the periphery of a wheel is scraped of by the blades 35 over the rear wheels and, as a result of the inclined position of these blades 35, is displaced outwardly of the tractor, to be deposited on the ground outside the tractor. Therefore, the blades 35 serve not only for scraping the wheels but also for transporting the scrapings to an area lying outside the tractor. Even on uneven ground the blades 35 remain effective, because the mudguards 34 to which the blades 35 are fastened turn together with the wheels 10 and 13 about the associated journal 5. The amount of earth sticking to the wheels will thus be small and a higher tractive force can be exerted.

The lower scraper 36 arranged near each front wheel 18 removes the major part of the material adhering to the wheel, whereas the upper scraper scapes off the remaining adhering material. The scraped-off material is conducted away along the horizontal limb of each of the scrapers 36 and deposited on the ground. Even when negotiating bends, when the front wheels are deflected, the scrapers 36 remain effective owing to their arcuate shape.

FIG. 3 shows a diagram of automatic control-means of the tractor for all working and travelling conditions. In this diagram hydraulic conduits are indicated by heavy lines, and the electric leads by lighter lines. Rotary shafts are represented by double lines and mechanical linkages by broken lines. The hydraulic pumps 44 are shown in two groups i.e. the pumps for the wheel motors 45 on the left-hand side of the tractor (reference numeral 61) and the pumps for the motors on the right-hand side of the tractor (reference numeral 62).

Both groups of pumps have adjusting means in the form of swashplates for varying the fluid displacement. The adjusting means for the pumps of each group are mechanically coupled with one another, whereas the pumps of each group can be adjusted independently of the other group by cylinder and piston units 63 and 64 respectively, controlled by servo-valves 65 and 66 respectively. These units are separately fed from an auxiliary pump 67.

The steering wheel 53 controls a power steering device 68, which is fed from a reservoir by an auxiliary pump 69 through an adjustable choke 70. The power steering device 68 operates a steering cylinder 71, of which the piston rod is coupled by a linkage 72 to the steering plate 21. A sensor 73 is mechanically connected with the linkage 72 and provides two signals representing different radii of curvature determined by the steering wheel 53 which are to be followed by the wheels on the two sides of the tractor respectively. The sensor 73 is electrically connected to the servo-valves 65 and 66.

The lower arms of the lifting devices 57 58 or both are displaceable over a short distance against spring force in lengthwise direction of the tractor, this being indicated schematically in FIG. 3. This displacement provides an indication of the tractive force exerted by the tractor on an implement hitched to the lifting device. A first sensor 76 is mechanically connected with the lower arms of the lifting device and detects the magnitude of their displacement. A further or second sensor 77 is arranged near the lifting device 58 and is connected by the same mechanical linkage as sensor 76 to the lower arms of the lifting device so that the sensor 77 provides a signal representing the magnitude of the deflection of the lower arms about the pivotal axis 75 with respect to a reference position (for example, the A still further or fourth sensor 83 is mechanically linked to the two beams 6 to provide a signal representing their mean position with respect to the frame beam 2.

In the cab 46, the console 50 is provided with a manually-operable control member 84 for controlling the travelling speed of the tractor and for selecting forwards and reverse travel. The console 50 also has a manually-operable control member 85 for adjusting the position of the lifting devices 57 and 58 respectively.

The sensors 73, 76, 77, 82, 83 may comprise potentiometers, the wipers of which are displaced, for example, by the applied mechanical signal It will be noticed that, in the array of the electric connections between the pump group, the control members and the various sensors, that switches are included for optionally switching on or off automatic operations. For example, between the valves 65 and 66 controlling the pump groups 61 and 62 and the steering sensor 73 or the manual speed control member 84 there is a switch 86 by means of which either the manual control member 84 or the sensor 73 can be connected to control the pumps 61 and 62.

When the switch 86 is closed, manual operation is selected, and the output signal of the control member 84 determines the desired tractor speed and the travel direction. The manual control member 84 is then directly connected electrically to the valves 65 and 66, which together control the swashplates of the pumps 61 and 62. For reverse travel, the flow of hydraulic fluid through the pumps can be reversed. Steering is effected through the rods 72, which can be adjusted by means of the steering device 68, the rods 72 causing the steering plate 21 to turn.

If the switch 86 is open, the sensor 73 is electrically connected to the valves 65 and 66, the output signal of the sensor 73 being representative of the steering angle. Therefore, in this case signals corresponding to the steering angle is conducted to the valves 65 and 66 through two leads, these signals having different magnitudes or different polarities. The swashplates of the pumps 61 on the one hand and those of the pumps 62 on the other hand are adjusted by the units 63 and 64 respectively so that the wheels on the two sides of the tractor rotate at different speeds causing the tractor to turn through a bend, the sharpness of which is proportional to the deflection of the steering wheel 53.

The sensor 76 can be connected by a switch 87 to the speed control member 84. If, for example due to changes of the soil structure, the tractive force required by the tractor drawing a plow increases, the lower lifting arms 74 will shift lengthwise of the tractor. The sensor 76 will then supply a signal voltage proportional to the increase in tractive force, so that, when the switch 87 is open, the control member 84 will be readjusted (without manual control) to cause the swashplates of all of the pumps 61 and 62 to be simultaneously adjusted so that the speed of the tractor is reduced.

sensor 76 can again assume its normal function through the valves 65 and 66 to adjust the travelling speed. If, however, the tractive force continues to increase despite the slight raising of the lifting device, and the limit is further exceeded, the signal of the sensor 77 will cause the lifting device to be raised further until, if necessary, the implement hitched to the lifting device is lifted completely out of the ground. In this way soil that can be worked only with difficulty is worked as far as possible to a uniform depth and only in specific cases is the implement lifted.

This effect can also be achieved, of course, by manual operation of the control member 84. However, the slight or complete lift of the implement involves the risk that the reduction of the tractive force may cause the travelling speed of the tractor to increase suddenly, which may cause accidents. The sensor 82 is, however, coupled with the lower lifting arms 74 in such a manner that a signal is generated when the arms are in a position in which the machine is almost free of the ground. This signal is transmitted through a switch 89 separately to the control member 84 to cause the valves 65 and 66 to decrease the swashplate angles of the pumps 61, 62 so that the travelling speed is automatically reduced. It should be noted that the circuit arrangement is constructed so that control by the sensor 76 is operative only when the safety feature obtained by the sensor 82 is also operative, since the connection of sensor 76 to the pumps 61, 62 is established only through the switch 89 of the safety circuit 82. The mean position of the tandem pairs is transmitted as an output signal of the sensor 83 through the switch 90 to the valve 79 of the lifting device. If the position of the beams 6 is such that the height of the frame above the ground increases, the valve 79 is energized so that the lifting device is lowered, and vice-versa. Since the hitched implement is located some distance behind the tandem pairs 6, 8, 10, 11, 13 it is important to include the choke 81 in the feed of the valve 79, to provide an adjustable delay. It should be noted that selection of manual or automatic control can be made by means of switches arranged near the driver.

Although various features of the tractor described and illustrated in the drawings will be set forth in the following claims as inventive features, the invention is not necessarily limited to these features and may encompass other features disclosed both individually and in various combinations.

Having described my invention, what I claim as new and desire to secure by Letters Patent of the United States is:

1. A motor vehicle comprising a power source and driven ground engaging members, and having a lifting device for attachment of further equipment to the vehicle, automatic control means being provided for controlling the transmission of power from said power source to driven ground engaging members of the vehicle in response to forces applied to the lifting device, said control means including a first sensor coupled with an arm of the lifting device, the output of said first sensor representing tractive force exerted by the vehicle on equipment hitched to said lifting device, this output being applied to said automatic control means, said control means further including a second sensor coupled with said lifting device, the output of said second sensor representing the magnitude of the deflection of a portion of said lifting device with respect to the rest of the vehicle and being applied to a valve for controlling a lifting arm of the lifting device, said control means operating to reduce the vehicle's speed automatically upon an increase in resistance applied by equipment hitched to the lifting device and to cause the equipment to be raised when the resistance reaches a limit value.

2. A vehicle in accordance with claim 1, which comprises a third sensor which is coupled with at least one of the arms of said lifting device and which provides an output signal when said arms are raised above a predetermined position.

3. A vehicle in accordance with claim 2, wherein the output signal of said third sensor renders at least part of the automatic control means inoperative.

4. A vehicle in accordance with claim 2, in which the output signal of said third sensor causes the vehicle's speed to be reduced.

5. A vehicle in accordance with claim 2, in which said first sensor will only operate if said third sensor will operate.

6. A vehicle in accordance with claim 1, comprising a vehicle frame in which said automatic control means comprises a fourth sensor which is responsive to said vehicle frame's height above the ground.

7. A vehicle in accordance with claim 1, comprising switch means for selectively rendering said sensors operative or inoperative.

8. A vehicle in accordance with claim 1, comprising a vehicle frame and two common supporting beams each pivotably mounted on said frame to pivot about an axis perpendicular to the vehicle's longitudinal axis, said two supporting beams pivotable independently of one another, said ground engaging members comprising wheels, a pair of said wheels arranged one behind the other which are mounted on each said supporting beam.

9. A vehicle in accordance with claim 8, comprising a further sensor, said further sensor being coupled with said two supporting beams so that the output signal of said further sensor represents the mean position of said two supporting beams with respect to said frame.

10. A vehicle in accordance with claim 9, comprising a lifting ram for said lifting device and a valve controlling fluid to and from said ram, the output signal of said further sensor being applied to said valve for controlling said lifting ram.

11. A vehicle in accordance with claim 9 in which each said supporting beam is provided on its side facing said frame of the vehicle with a rotatable plate for rotatably supporting same on said frame beam.

12. A vehicle as claimed in claim 1, wherein said driven ground engaging members comprise at least four drivable wheels.

13. A vehicle as claimed in claim 12, wherein said wheels consist of six drivable wheels.

14. A vehicle as claimed in claim 1, comprising at least one lower arm in said lifting device which is resiliently displaceable lengthwise of the vehicle with respect to the rest of the vehicle under the tractive force exerted by the tractor on an implement hitched to said lifting device.

15. A vehicle as claimed in claim 14, wherein said first sensor is mechanically coupled with said displaceable device, the output of said first sensor representing the tractive force.

16. A vehicle as claimed in claim 15, comprising pumps and valves therefor for the transmission of power from said power source to said ground engaging members, said output of said first sensor being applied to said valves for controlling said pumps.

17. A vehicle as claimed in claim 16, wherein said lifting device comprises a ram for raising and lowering same and a further valve controlling said ram, said second sensor being mechanically coupled with said lifting device and being responsive to the position of said arms of said lifting device, the output of said second sensor being applied to said further valve for controlling the relative height of said lifting device.

18. A vehicle as claimed in claim 17, comprising a third sensor which is coupled with at least one of said arms and provides an output signal when said arms are raised above a predetermined position.

19. A vehicle as claimed in claim 18, comprising means for communicating said output signal of said third sensor to said valves of said hydraulic pumps so that said automatic control means is at least in part deactuated.

20. A vehicle as claimed in claim 18, in which said pumps comprise hydraulic pumps with variable stroke pistons, said output signal from said third sensor causes the displacement of said pistons in said hydraulic pumps to be decreased.

21. A vehicle as claimed in claim 20, in which said first sensor for the tractive force in said arm of the lifting device is only operative when said another sensor is operative.

22. A vehicle as claimed in claim 21 comprising a vehicle frame and one said automatic control means which comprises height sensing means whereby said automatic control means is responsive to the height of said frame above the ground.

23. A motor vehicle in accordance with claim 1 wherein said power source comprises an engine and at least two hydraulic pumps and motors, and said driven ground engaging members comprise at least two wheels, each said wheel being hydraulically drivable independently of each other said wheel by fluid supplied by a respective said hydraulic pump to a respective hydraulic motor associated with a corresponding said wheel, said pumps being drivable by said engine.

24. A vehicle as claimed in claim 23, in which the displacement of each said hydraulic pump is adjustable.

25. A vehicle as claimed in claim 24, in which said hydraulic pumps are adjustable simultaneously to the same extent and in the same sense.

26. A vehicle as claimed in claim 23 in which the displacements of said hydraulic pumps are adjustable to a different extent.

27. A vehicle as claimed in claim 24 comprising automatic control means, in which the displacement of each said hydraulic pump is adjustable by said automatic control means.

* * * * *